(12) United States Patent
Kuwajima et al.

(10) Patent No.: US 7,905,012 B2
(45) Date of Patent: Mar. 15, 2011

(54) METHOD FOR MANUFACTURING ELECTRONIC COMPONENTS

(75) Inventors: Hajime Kuwajima, Tokyo (JP); Hitoshi Ohkubo, Tokyo (JP); Manabu Ohta, Tokyo (JP)

(73) Assignee: TDK Corporation, Tokyo (JP)

( * ) Notice: Subject to any disclaimer, the term of this patent is extended or adjusted under 35 U.S.C. 154(b) by 413 days.

(21) Appl. No.: 12/029,832

(22) Filed: Feb. 12, 2008

(65) Prior Publication Data

US 2008/0236870 A1   Oct. 2, 2008

(30) Foreign Application Priority Data

Mar. 29, 2007  (JP) ................................ 2007-089900

(51) Int. Cl.
*H05K 3/02* (2006.01)
(52) U.S. Cl. ............. 29/847; 29/413; 29/831; 29/851; 156/150; 156/236; 257/620; 438/114; 438/464
(58) Field of Classification Search .......... 156/150, 156/236, 241, 250; 205/125; 257/620, 786; 438/33, 113, 114, 460, 462, 464; 29/413, 29/830–832, 835, 846, 848, 852, 853
See application file for complete search history.

(56) References Cited

U.S. PATENT DOCUMENTS

| 3,324,014 | A * | 6/1967 | Modjeska | 29/848 |
| 6,562,647 | B2 * | 5/2003 | Zandman et al. | 438/33 |
| 7,208,335 | B2 * | 4/2007 | Boon et al. | 438/464 |

FOREIGN PATENT DOCUMENTS

| JP | 7-254534 | 10/1995 |
| JP | 8-236307 | 9/1996 |
| JP | 2001-237268 | 8/2001 |
| JP | 2004-289085 | 10/2004 |
| JP | 2004-296675 | 10/2004 |
| JP | 3613091 | 11/2004 |
| JP | 2005-268302 | 9/2005 |
| JP | 2006-80496 | 3/2006 |

OTHER PUBLICATIONS

Chinese Office Action (with English translation) issued on Dec. 17, 2010, in Chinese Patent Appln. No. 2008100869064 (15 pages).

* cited by examiner

*Primary Examiner* — Donghai D. Nguyen
(74) *Attorney, Agent, or Firm* — Oblon, Spivak, McClelland, Maier & Neustadt, L.L.P.

(57) ABSTRACT

A method for manufacturing an electronic component includes: a step of temporarily bonding a substrate to a support plate with an adhesive sheet; a step of forming a cut groove for dividing the substrate into individual chips by providing the substrate with a cut extending in the thickness direction from a second surface side, located opposite the first surface side, to a certain part of the support plate; a step of forming a continuous electrode on the second surface and on a peripheral surface located inside the cut groove, of each of the chips by sputtering, for example; and a step of detaching the chips from the support plate. An electrode on the first surface of the substrate may be formed prior to the temporary bonding step, and the electrode formed on the peripheral surface may be connected to the electrode on the first surface.

15 Claims, 7 Drawing Sheets

METHOD FOR MANUFACTURING ELECTRONIC COMPONENTS

BACKGROUND OF THE INVENTION

The present invention relates to an electronic component and a method for manufacturing the same. More specifically, the present invention relates to a technique for forming a conductor such as a terminal electrode on an outer surface of a chip-shaped electronic component (hereinafter also simply referred to as a chip in some cases).

Electronic components including various discrete components such as chip capacitors, chip inductors or chip resistors, and various electronic devices formed by combining multiple active and passive elements are offered today. Any of these electronic components needs terminal electrodes provided on the outer surface thereof so as to establish electrical and mechanical connection with the outside, thus being mounted on a wiring board.

Such a terminal electrode has heretofore been formed, for instance, by: printing and coating a conductive material (a conductive paste or a conductive resin) at a predetermined position and in a predetermined shape by use of a mask for each chip which has been functionally configured; then performing hardening and baking processes; and subjecting the terminal electrode to plating as appropriate. The layout of the electrode is generally formed into a "U" shape in which the electrode is disposed on three surfaces of: a top surface (a front surface); a bottom surface (a rear surface); and a peripheral surface (a side surface or an end surface). Alternatively, the layout of the electrode is formed into an "L" shape in which the electrode is disposed on two surfaces of: the peripheral surface; and either of the top surface or the bottom surface.

The electrode on the top and bottom surfaces is provided for the purposes of: mounting the chip on a substrate, establishing an electrical connection to wiring on the substrate, evaluating the characteristics, and the like. Meanwhile, the electrode on the peripheral surface is provided as a wiring section for drawing the conductor inside the component out to a mounting surface of the substrate. Moreover, this electrode plays the role for mechanically fixing and retaining other components in addition to establishing electrical connection to the substrate.

As for procedures to form the terminal electrodes, a wiring layer which become a functional composition section of the electronic component, an insulating layer, a function layer, a protective film layer, wiring exposed sections for establishing connection to the terminals, and the like collectively constituting a functional composition section of the electronic components are formed in a combination board (or a wafer), and then this board is cut into individual chips. Thereafter, the terminal electrodes are formed on one or both of the top and bottom surfaces of each chip, and formed on the peripheral surfaces of the chip so as to extend in a perpendicular direction. The electrodes on the top and bottom surfaces may be formed in advance in the step of forming the functional composition section, and the order of formation of the terminal electrodes varies in consideration of bonding quality or ease of electrode formation. Further, in order to reduce the number of processes for forming the terminals, there is also known a method of forming the electrodes simultaneously on the top and bottom surfaces of the chip by delivering an electrode material onto those surfaces during formation of the electrode on the peripheral surface of the chip, which is assisted by chamfering (or so-called "rounding") the corner of the chips.

On the other hand, it is also possible to apply a thin-film method instead of the above-described thick-film method. Specifically, electrode films are formed by use of a vapor deposition system such as a sputtering system or an evaporation system while each chip is fixed with a jig and covered with a mask. In order to form the electrode on multiple surfaces, it is only necessary to change the orientation of the chip and to repeat the film forming process similarly. Moreover, terminals are further plated on the thin film thus formed when it is appropriate.

The following patent documents also disclose a technique for forming such terminal electrode:

(1) Patent Document 1: Japanese Unexamined Patent Application Publication No. Heisei 7 (1995)-254534 (JP-A-7-254534);

(2) Patent Document 2: Japanese Patent No. 3613091 (JP-B-3613091); and (3) Patent Document 3: Japanese Unexamined Patent Application Publication No. 2004-289085 (JP-A-2004-289085).

SUMMARY OF THE INVENTION

The conventional terminal electrode structures and the methods of forming the terminal electrodes have the following problems, which need to be solved.

First, the method of applying the thick-film method using the conductive paste and the conductive resin requires a high-temperature treatment equal to or above 500° C. in the manufacturing process in order to bake and harden these conductive materials. Accordingly, in this method, the materials used in the chip are required to have heat resistance at least equal to or above that temperature, and the applicable materials are limited only to the materials having such high heat resistance. Here, development in the conductive resin is advancing along the progress in the nanopaste technology. With this development, materials that are hardenable by a thermal treatment at a temperature of 300° C. or below have been offered in recent years. However, these materials are still expensive and practically difficult to be used for electronic component products as mass products which are necessarily subject to cost restraints.

Moreover, in the method of applying the thick-film method, it is becoming more difficult to form the electrodes, with sufficient dimensional accuracy, for the electronic components becoming smaller in size every year. This is because a paste material has a fluidity and easily varies in coating accuracy depending on coating conditions, that is, various factors such as roughness or an active state (wettability) of a surface subjected to coating, an ambient environment (an atmosphere) or an amount of paste. Particularly, a high-frequency electronic component requires strict accuracy in the dimensions of the terminals to satisfy a demand in mounting accuracy, and it is not easy to form the electrodes on multiple terminals provided on a minute electronic component product by coating the paste uniformly. Moreover, variation or unevenness in the dimensions of the shapes of terminal electrodes between right and left ends of the component may be a cause of the so-called Manhattan phenomenon (the tombstone phenomenon) that brings about defective mounting as the chips stand up at the time of solder reflow mounting, for example.

In addition, the conductive paste contains an organic component and a Si-type medium. These substances are discharged from the electrodes by baking at a high temperature. However, the state of the remaining conductive material lacks precision and the surface of the conductive material is covered with an oxide film as a result of the high-temperature backing. For this reason, in the case of performing a terminal plating process afterwards, it is conceivable that a state of bonding on an interface between a foundation electrode and a plated terminal is established by an alloy layer and bonding attributable to an anchor effect. Accordingly, the bonding property may be unstable depending on the surface condition.

Meanwhile, in the case of the conductive resin, a medium material remains included in a foundation electrode because a thermal treatment is conducted at a relatively low temperature which is equal to or below 300° C. Therefore, it is possible to achieve favorable adhesion on an interface with the surface of the plated terminal when numerous conductor particles are exposed on a surface of the foundation electrode. Nevertheless, there is a risk of reduction in the bonding property on the interface with the plated terminal regarding of a section on the surface of the foundation electrode where few conductor particles are exposed.

On the other hand, the method applying the thin-film method requires a jig for retaining and arraying the individual chips at the time of forming the electrode similarly to the above-described case according to the thick-film method as well as the methods according to Patent Document 1 (JP-A-7-254534) and Patent Document 2 (JP-B-3613091). In addition, this method also requires a cumbersome operation to load these extremely small chips individually on this jig. Moreover, in order to load the chips on the jig, it is indispensable to provide a clearance between the chips and the jig, whereas it is not easy to position the chips relative to a mask accurately. In particular, an effect of positioning error becomes relatively greater as the chip size becomes smaller, thereby leading to variation in the shape (width, length, and thickness) of the terminal or in the precision of layout positions.

Meanwhile, in the method according to the aforementioned Patent Document 3 (JP-A-2004-289085), terminal electrodes (external electrodes) are formed in a step before the substrate is divided into individual chips. Therefore, it is possible to avoid complexity of handling the individual chips for forming the terminals. However, the method according to this document requires two steps of forming a half-cut groove from a bottom surface side of a component and forming a groove for penetrating the half-cut groove from a top surface side in order to divide the substrate into the individual chips after formation of the electrodes. Moreover, it is also necessary to align the groove for penetrating the half-cut groove accurately with the half-cut groove. This process is extremely difficult if the component is reduced in size. In addition, the method according to this document cannot realize formation of the U-shaped terminal electrode that covers the top surface, the peripheral surface, and the bottom surface of the component.

Further, in the case of forming the electrodes across multiple surfaces (such as from the top surface or the bottom surface to the side surface or the end surface) according to the conventional method applying the thin-film method, it is necessary to carry out at least two steps of: (1) forming an electrode film on one surface (such as the top surface or the bottom surface) of the chip; and then (2) removing the chip from the jig to change the orientation of the chip and forming an electrode film on another surface (such as the side surface or the end surface). Therefore, in addition to an increase in the number of steps, this method may result in poor strength attributable to interposition of an oxide film (caused by oxidation of a surface of the electrode film formed in the beginning) or a contaminant on a bonding interface between the electrode film formed in the beginning and the electrode formed thereafter. As a consequence, there are a risk of infiltration of a plating fluid used in a subsequent terminal plating process and a risk of deterioration or detachment due to long-term usage after being mounted as a product.

Along with the downsizing of electronic devices in recent years, the progress in downsizing and low-profiling of electronic components used in the electronic devices is significant. While accuracy requirements (accuracy in the shape and precision in positions of formation) of terminal electrodes included in the electronic components are getting stricter, the components per se are becoming extremely smaller and thinner. Such downsizing and low-profiling trends seem to continue. Therefore, the above-described problems are expected to become more evident in the future.

Moreover, in addition to the conventional external connection terminal structure, the terminal electrodes formed on the outer surface of the chip are required to deal with multi-terminal geometry and variations in the shape, number, and layout positions as observed in adoption of a bottom surface terminal structure such as an LGA (land grid array) or a BGA (ball grid array). From the viewpoint of cost, the cost of forming the terminal electrodes is an increasing proportion of the total manufacturing cost of electronic component products. Hence there is a demand for techniques to form highly reliable terminal electrodes at high accuracy by a more simple method.

Accordingly, an object of the present invention is to satisfy such a demand by forming a highly reliable terminal electrode in an arbitrary position and an arbitrary shape accurately and efficiently.

To solve the foregoing problems and to attain the object, a method for manufacturing an electronic component of the present invention includes: a temporary bonding step of temporarily bonding a substrate to a support plate by pressing a first surface of the substrate onto the support plate with an adhesive sheet interposed therebetween; a substrate dividing step of forming a cut groove for dividing the substrate into an individual electronic component by providing the substrate with a cut extending in the thickness direction from a second surface side, located opposite the first surface side, to a certain part of the support plate; a continuous electrode forming step of forming a continuous electrode on the second surface and on a peripheral surface located inside the cut groove, of the electronic component; and a component detaching step of detaching the electronic component from the support plate.

The method for manufacturing an electronic component of the present invention relates to a method for manufacturing multiple pieces of electronic components by dividing a single substrate (a combination board or a wafer) into multiple sections to form chip-shaped electronic components. However, unlike the conventional method, the arrayed state of the chips is maintained, after dividing the combination board into the chips. In this arrayed state, the continuous electrodes from the second surfaces to the peripheral surfaces are simultaneously and collectively formed on the respective chips.

In the present invention, in order to maintain the arrayed state of the chips, the substrate is temporarily bonded to the support plate as described above so as to attach the first surface to the support plate. Then, the substrate is divided into the individual chips by forming, on the substrate, the cut grooves extending in the thickness direction from the second surface of the substrate to a certain part of the support plate (in other words, to an appropriate depth for cutting the substrate off but not cutting the support plate completely). If the electronic component is a hexahedron (a rectangular parallelepiped or a cube), it is only necessary to provide some cut grooves in a first direction for cutting the substrate and in a second direction orthogonal to the first direction, respectively.

In the following description, the chip will be explained as a hexahedron (a rectangular parallelepiped or a cube having six outer surfaces in which adjacent surfaces are defined orthogonal to each other). However, the electronic component according to the present invention is not limited only to the hexahedron. It is also possible to form other shapes having triangular, polygonal, circular, ellipsoidal, or other planar shapes in accordance with the design of the cut grooves formed on the substrate. It is to be noted that the electronic components having these various shapes are also included in the present invention.

The peripheral surfaces of the chips are exposed (formed) by forming the cut grooves on the substrate (dividing the substrate into the chips) as described above. Then, the electrodes are formed simultaneously on the peripheral surfaces and the second surfaces of the substrate (the chips). In this way, it is possible to form the continuous electrodes having the L-shape which is viewed from a cross section of each of the chips. The individual chips can be detached from the support plate after forming the electrodes.

The first surface constituting the outer surface of the chip forms a bottom surface (or a top surface) of the chip while the second surface forms a top surface (or a bottom surface) of the chip. Meanwhile, the peripheral surfaces also constituting the outer surfaces of the chip includes a pair of side surfaces and a pair of end surfaces. Upon formation of the electrodes on the peripheral surfaces, it is naturally unnecessary to form the electrodes on all the peripheral surfaces, namely, the two (pair of) side surfaces and the two (pair of) end surfaces. It is possible to form the electrodes on arbitrary surfaces out of these four surfaces as appropriate. Meanwhile, including the second surface, the number and the shape of the electrodes to be formed on one surface are not limited only to a specific number or a specific shape, and it is therefore possible to satisfy various demands.

Moreover, the manufacturing method may further include a first surface electrode forming step of forming an electrode on the first surface of the substrate prior to the temporary bonding step. Here, in the continuous electrode forming step, the continuous electrode to be formed on the peripheral surface of the chip may be formed so as to be connected to the electrode formed in the first surface electrode forming step. According to this method, it is possible to form the electrode having a U-shaped cross section.

The type and the material of the support plate are not particularly limited as long as the support plate is able to support the substrate and to retain the divided chips in the arrayed state. For example, it is possible to use a resin plate, a ceramic plate or other plate. Alternatively, the support plate may have a composite structure formed by coating a resin material on a surface of a base (such as a metal plate made of SUS).

Meanwhile, in a preferred aspect, the adhesive sheet used for temporary bonding contains, as a main component, a resin soluble to a solvent, and the component detaching step includes a process to immerse the electronic component temporarily bonded to the support plate into the solvent. This process is executed in order to detach the temporarily bonded chips from the support plates with a simple operation, and thereby to obtain the individual chips.

An acrylic resin can be used for the resin constituting the adhesive sheet, for example. A liquid containing an alcohol as a main component can be used for to the solvent, for example.

The component detaching step may further include a process to apply ultrasonic waves to the electronic component that is temporarily bonded to the support plate. It is possible to detach the respective chips more reliably from the support plate by applying ultrasonic oscillation.

The temporary bonding step is executed preferably in a reduced pressure or more preferably in a vacuum (subjected to vacuum press). This process is executed in order to prevent air from leaking into a space between the substrate and the support plate and thereby to fix the substrate more securely to the support plate. In particular, even if the first surface to be pressed against the adhesive sheet has significant irregularities (such as irregularities attributable to a conductor pattern), it is possible to render the substrate supported favorably by the support plate by means of performing the temporary bonding step either in a reduced pressure or in a vacuum.

Formation of the electrode on the second surface and the peripheral surface located inside the cut groove, of the chip can be achieved by a subtractive method, for example. To be more precise, the continuous electrode forming step may include: a conductive film forming process to form a conductive film on the second surface and the peripheral surface located inside the cut groove, of the chip; a resist forming process to form a resist film on the conductive film; a resist mask forming process to selectively remove the resist film in response to the shape of the electrode to be formed; an etching process to selectively remove the conductive film by using the resist mask; and a resist peeling process to remove the resist mask.

Alternatively, it is also possible to use an additive method. To be more precise, the continuous electrode forming step may include: a conductive film forming process to form a conductive film on the second surface and the peripheral surface located inside the cut groove, of the chip; a resist forming process to form a resist film on the conductive film, a resist mask forming process to selectively remove the resist film in response to the shape of the electrode to be formed; a plating process to deposit a plated metal film on the conductive film by using the resist mask; a resist peeling process to remove the resist mask; and an etching process to remove the conductive film located below the resist mask.

Further, the continuous electrode forming step may include a thin-film forming process to form a thin film on the second surface and the peripheral surface of the chip by use of a vapor deposition method after formation of the cut groove by the substrate dividing step. In this case, it is advantageous to use the sputtering method, for example, as the vapor deposition method because it is possible to prevent unnecessary materials such as dust or residue from floating at the time of detaching the chip from the support plate later.

To be more precise on this point, when the electrode is formed on the second surface and the peripheral surface of the chip by use of the vapor deposition method as described above, the film material is also deposited on a bottom surface of the cut groove (a top surface of the support plate), and the electrode film is thereby formed. This film attached to the bottom surface of the cut groove (the top surface of the support plate) is unnecessary for the chip, and should therefore remain attached to the support plate when detaching the chip. In particular, when the chip is detached by means of immersion in the solvent liquid as described previously, the unnecessary materials floating in the solvent liquid may be attached to the chip and cause a factor to contaminate the chip. According to the sputtering method, the film on the bottom surface of the cut groove is firmly supported by the top surface of the support plate. Therefore, it is effective to avoid this portion of the film from floating in the solvent liquid as dust.

Here, the electrode film is also formed on a wall surface of the cut groove (a space between the bottom surface of the cut groove and the first surface of the substrate). However, the film on the wall surface portion defined parallel to a direction of sputtering irradiation has relatively smaller film-thickness distribution or weaker adhesion in comparison with the film on the bottom surface of the cut groove defined perpendicularly to the direction of sputtering irradiation. Accordingly, this portion on the wall surface of the groove is cut out when detaching the chip so that the chip can be easily detached from the support plate.

The above-described thin film may be a film containing any of chromium, titanium, nickel, nickel-chromium, tungsten, copper, and silver as a main component. The continuous electrode forming step may further include a process to form an electrolytically plated copper film.

Meanwhile, an electronic component according to the present invention is an electronic component including an electrode formed so as to extend over one or both of a top surface and a bottom surface as well as a peripheral surface existing between the top surface and the bottom surface. The electrode includes a foundation electrode film placed on a surface of the substrate, and a main electrode film placed on this foundation electrode film. Here, the foundation electrode film is a film formed continuously over one or both of the top surface and the bottom surface as well as over the peripheral surface.

By applying the above-described electrode structure, it is possible to reduce an interface with the electrode film as compared to the conventional terminal electrode structure by forming the film continuously over the top and/or bottom surfaces and the peripheral surface of the chip. In particular, it is possible to prevent detachment or deterioration of a corner section of the chip favorably, and thereby to improve durability and reliability of terminals.

Moreover, the foundation electrode film can be made of a thin film formed by a vapor deposition method or an electroless plating method. This thin film may be a film containing any of chromium, titanium, nickel, nickel-chromium, tungsten, copper, and silver as a main component.

The electrode in the present invention typically includes an external connection terminal configured to establish electrical (and/or mechanical) connection with a substrate, an external element, a module, a device, and the like. However, the electrode will not be limited only to this configuration. For example, the electrode may be: a connection pad (such as a flip-chip bonding pad or wire-bonding pad) provided on a surface of a chip for mounting an IC or other electronic components, electronic modules or electronic elements; a connection electrode such as a bump or a post; an electrode pad for the LGA (land grid array) or the BGA (ball grid array); wiring (such as a line for connecting functional units together or a functional unit to a terminal, or a line for impedance adjustment); and so forth. The electrode of the present invention encompasses various conductors to be formed on a surface of a chip.

Moreover, the electronic component (the chip) according to the present is not limited to any particular type and encompasses discrete components or chip components (such as a chip capacitor, a chip inductor, a chip resistor, a chip thermistor or a chip varistor), as well as electronic devices including multiple electronic elements (active elements and passive elements).

According to the present invention, it is possible to form a highly reliable terminal electrode accurately and efficiently in an arbitrary position or shape.

Other objects, features and advantages of the invention will become apparent from the following description of the embodiments of the invention taken in conjunction with the accompanying drawings. In the drawings, similar reference characters denote similar elements throughout the several views.

DESCRIPTION OF THE EMBODIMENTS

Figure 15:
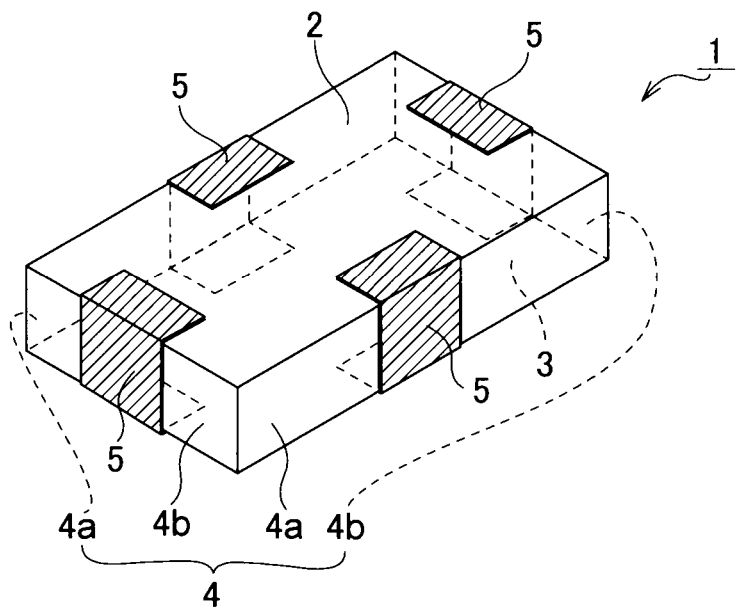
FIG. 15 is a perspective view showing an example of a terminal structure of an electronic component formed in by the method for manufacturing an electronic component according to the embodiment.

FIG. 1 to FIG. 13 sequentially shows the steps of a method for manufacturing an electronic component according to an embodiment of the present invention. The method for manufacturing an electronic component according to the embodiment is based on the premise of providing a chip component 1 having a rectangular parallelepiped (hexahedronal) overall shape as shown in FIG. 15, for example, with an aggregate of four terminal electrodes 5 corresponding to four peripheral surfaces 4a, 4a, 4b, and 4b so that each terminal electrode 5 has a U-shaped cross section (a U shape) that extends from a top surface 2 to the peripheral surface 4 (a side surface 4a or an end surface 4b) and to a bottom surface 3. As described previously, the number, the shape, and layout positions of the terminal electrodes 5 may apply various other aspects and it is therefore needless to say that the present invention will not be limited only to the illustrated example.

Figure 1:
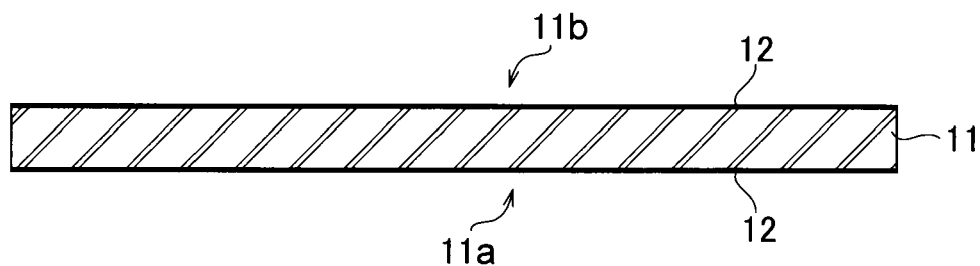
FIG. 1 is a schematic diagram sequentially showing a step (preparation of a base material) of a method for manufacturing an electronic component according to an embodiment of the present invention.

As shown in FIG. 1, a substrate 11 is firstly prepared as a base material for forming a chip component. This substrate 11 is typically a ceramic substrate made of alumina ($Al_2O_3$), a resin substrate, a composite material substrate formed by mixing inorganic filler with resin or any other substrates. The materials of the substrate are not particularly limited. Moreover, the substrate 11 may also be a multilayer substrate formed by laminating multiple wiring layers and insulating layers and may contain various functional elements (such as capacitors, inductors or resistors), wiring, interlayer connection structures (such as via holes), and the like. Further, planarization films or insulating films 12 may be provided on a bottom surface 11b and a top surface 11a of the substrate 11 when appropriate. For example, it is possible to enhance adhesion of the substrate 11 to a foundation electrode 13 to be formed later by providing a surface layer by means of coating polyimide as the planarization film.

Figure 2:
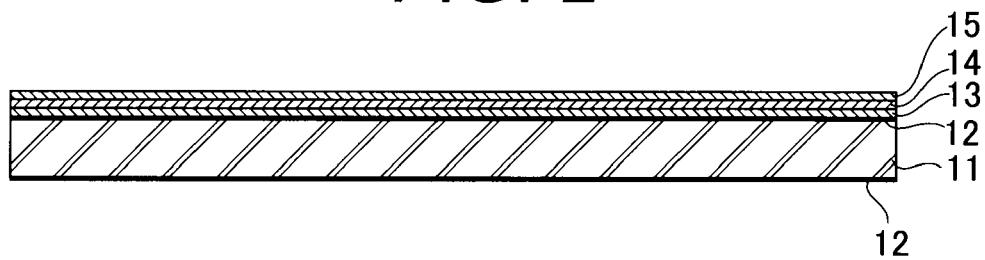
FIG. 2 is a schematic diagram sequentially showing a step (formation of a bottom-surface electrode film) of the method for manufacturing an electronic component according to the embodiment.
Figure 3:
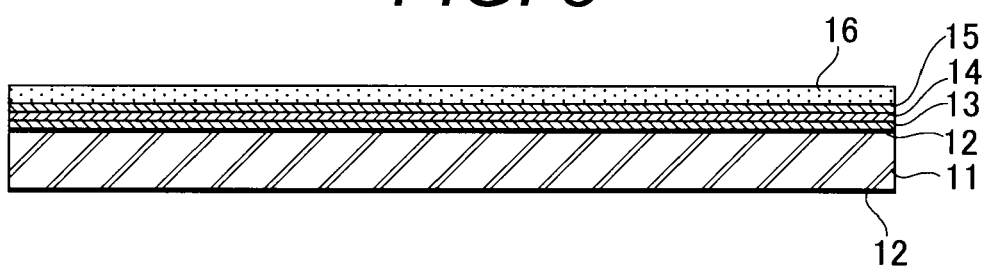
FIG. 3 is a schematic diagram sequentially showing a step (resist coating) of the method for manufacturing an electronic component according to the embodiment.
Figure 4:
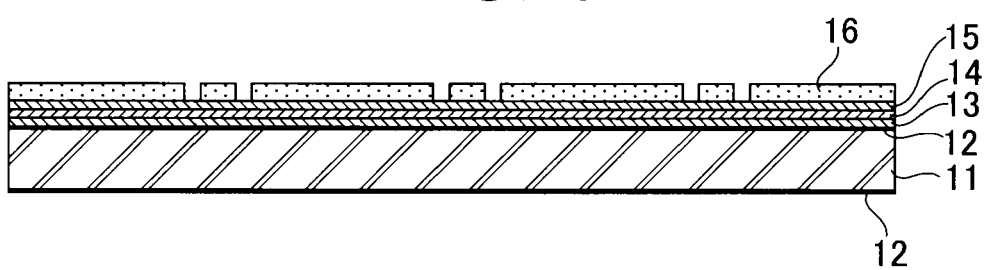
FIG. 4 is a schematic diagram sequentially showing a step (formation of an etching mask) of the method for manufacturing an electronic component according to the embodiment.
Figure 5:
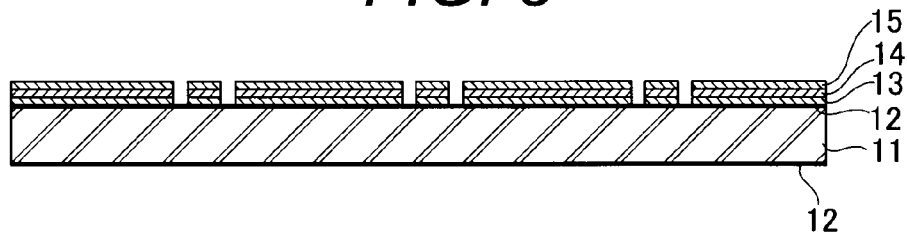
FIG. 5 is a schematic diagram sequentially showing a step (etching) of the method for manufacturing an electronic component according to the embodiment.

As shown from FIG. 2 to FIG. 5, a foundation electrode is formed on the bottom surface 11b of this substrate 11. First, a chromium (Cr) film 13 and a copper (Cu) film 14 are sequentially deposited on the bottom surface 11b of the substrate 11 by sputtering, and a Cu plated film 15 is formed thereon by electrolytic plating (FIG. 2). Thereafter, a resist 16 is coated on the Cu plated film 15 (FIG. 3) and an etching mask is formed by subjecting this resist 16 to an exposure-development process (a photolithographic process) (FIG. 4). The Cu films (the Cu plated film 15 and the Cu sputtered film 14) are etched by using this mask, and then the resist 16 is peeled off and the Cr film 13 is etched by using the Cu films 14 and 15 as a mask. In this way, it is possible to form the foundation electrode on the substrate bottom surface 11b which later serves as a bottom surface of a chip (FIG. 5).

Figure 6:
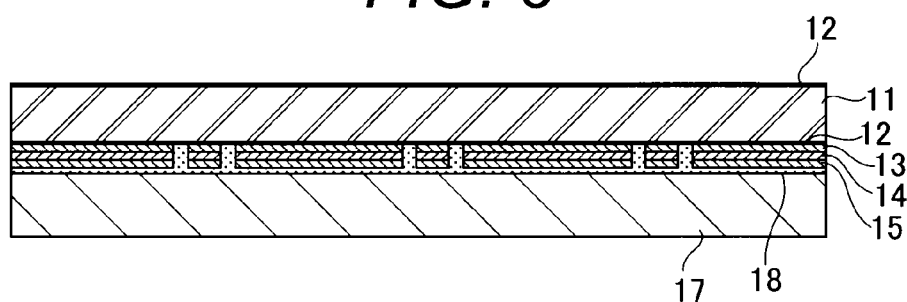
FIG. 6 is a schematic diagram sequentially showing a step (attachment to a dummy substrate) of the method for manufacturing an electronic component according to the embodiment.

After forming the electrode on the substrate bottom surface 11b, the substrate 11 is turned over as shown in FIG. 6 and the substrate 11 is fixed (temporarily bonded) to a support plate 17 so as to press the bottom surface 11b of the substrate 11 against the support plate 17. At this time, an adhesive sheet 18 is interposed between the substrate 11 and the support plate 17, and the substrate 11 is bonded to the support plate 17 by means of vacuum press. An acrylic resin sheet that is soluble to a solvent later is used for the adhesive sheet 18.

Figure 13:
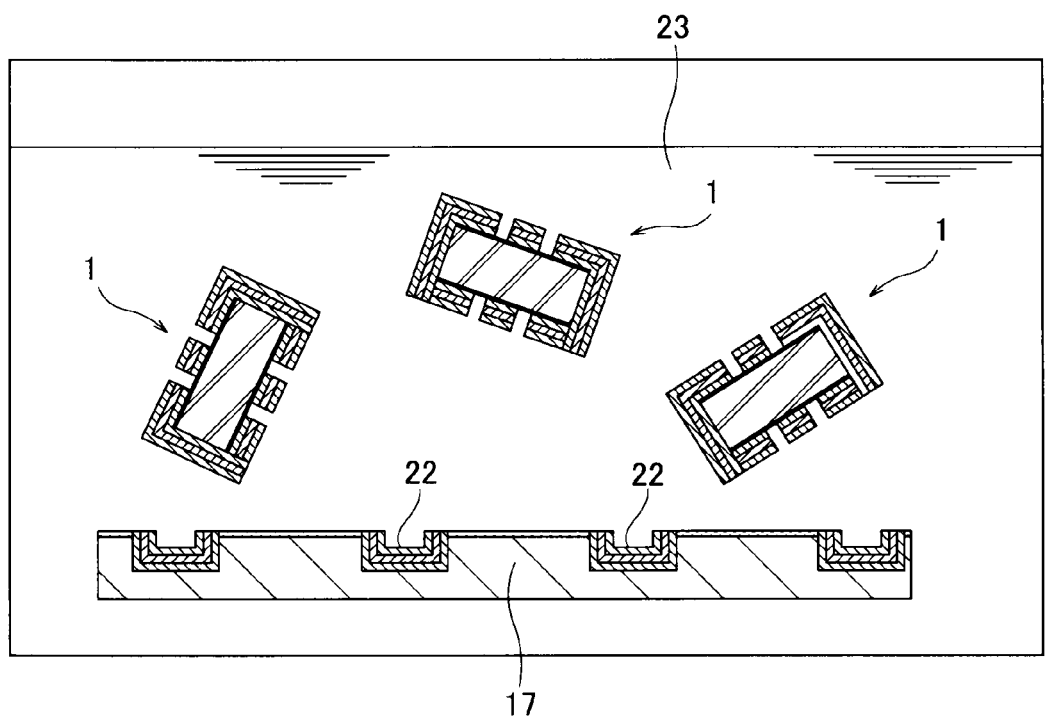
FIG. 13 is a schematic diagram sequentially showing a step (chip separation) of the method for manufacturing an electronic component according to the embodiment.

It is possible to use a plate made of resin, a ceramic, metal (such as stainless steel) or the like as the support plate 17. However, it is preferable to use a material having favorable grinding workability or heat resistance. In addition, it is preferable to use a material having good adhesion to the sputtered film (a material having high compatibility with an interface), a material having chemical resistance, a material causing less gas emission, an inexpensive material (particularly for the surface for attaching the substrate 11). These requirements are aimed to prevent an excessive sputtered film 22 on a bottom surface of a cut groove from: being detached from the support plate; being floating in the liquid; and being attached to the chip 1, when the chip 1 is detached later by immersing the substrate 11 into a solvent (FIG. 13). To be more precise, when any of Cr, Ni, Ti, NiCr, W, Ag, and Cu is used for a bonding film of foundation electrode films 19 to 21 (see FIG. 11) of the top surface and the peripheral surfaces of the chip which are later formed by sputtering, it is preferably to use a FR4 plate, a FR5 plate, a polyimide plate, or a liquid crystal polymer plate as the support plate 17.

Figure 7:
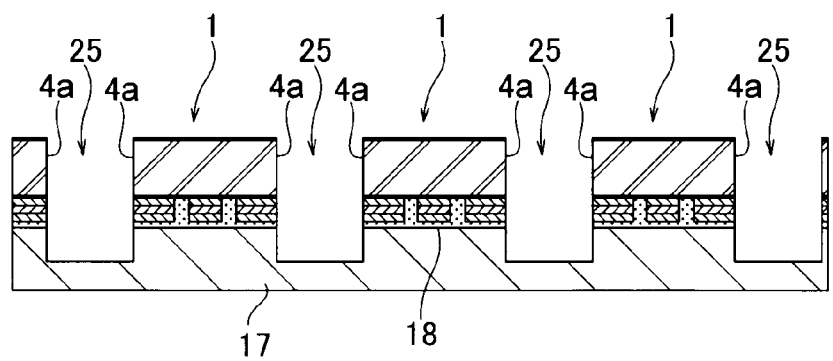
FIG. 7 is a schematic diagram sequentially showing a step (chip division) of the method for manufacturing an electronic component according to the embodiment.
Figure 14:
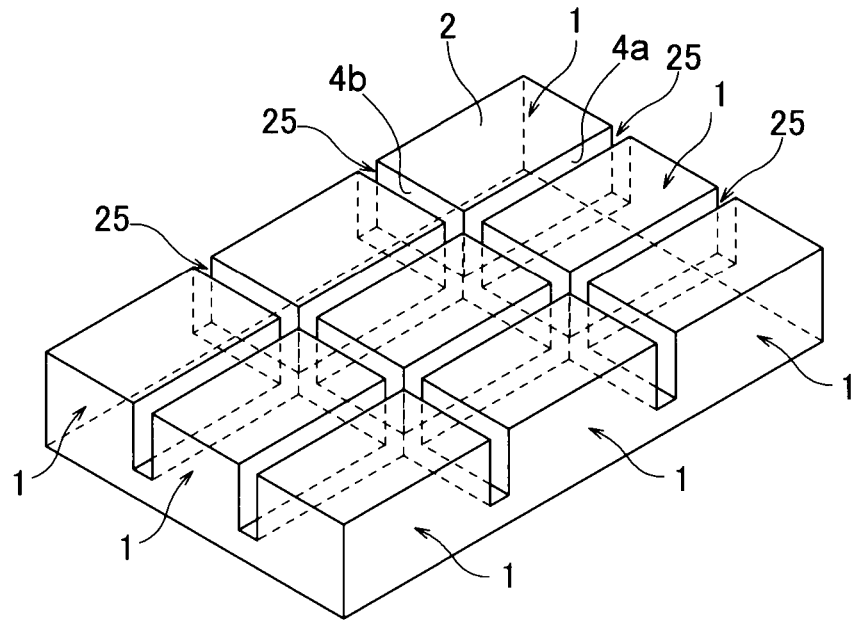
FIG. 14 is a schematic diagram sequentially showing a step (formation of a cut groove) of the method for manufacturing an electronic component according to the embodiment.

After fixing the substrate 11 to the support plate 17, the substrate 11 is cut out and divided into the chips 1. As shown in FIG. 7, this dividing operation is conducted by forming cut grooves 25 extending in the thickness direction from the top surface side of the substrate 11 to a certain part of the support plate 17. These cut grooves 25 are formed not only in one direction but also lengthwise and crosswise (in two directions perpendicular to each other) as shown in FIG. 14. In this way, the substrate 11 is divided into the chips 1. However, the respective chips 1 are still bonded to the support plate 17 with the adhesive sheet 18, even after the respective chips 1 are divided from the substrate 11. Thus, the respective chips 1 are retained in an arrayed state on the support plate 17 without coming off.

At the same time, the peripheral surfaces (the side surfaces and the end surfaces) of the chips are defined by forming the cut grooves. In addition, by forming the cut grooves 25, it is also possible to draw out (expose) electrodes (not shown) provided inside the substrate 11, for example. It is also possible to connect the peripheral surface electrodes 19 to 21 to this exposed section by forming the electrodes on the chip peripheral surfaces to be described later and to connect the electrodes inside the substrate to the electrodes on the top surface and the bottom surface of the chip, for example.

Figure 8:
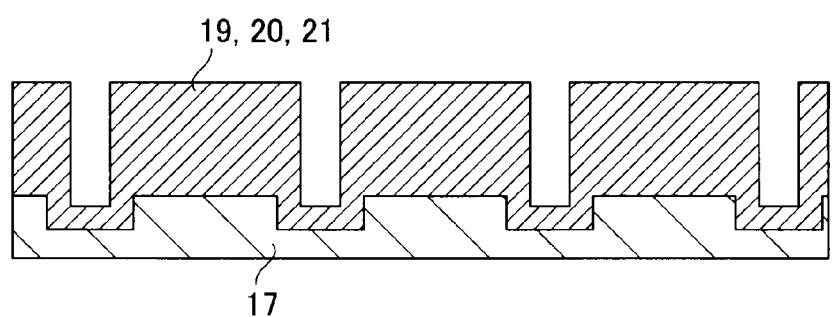
FIG. 8 is a schematic diagram sequentially showing a step (formation of an electrode film on a top surface and a peripheral surface) of the method for manufacturing an electronic component according to the embodiment.

After dividing the substrate into the chips 1, the electrode films (the foundation electrode films) 19 to 21 are formed on the top surfaces as well as the side surfaces and the end surfaces, located inside the cut grooves 25, of the respective chips 1 (the substrate 11) as shown in FIG. 8. As similar to the foundation electrode films 13 to 15 formed on the bottom surfaces of the chips, these electrode films 19 to 21 (see FIG. 11) are formed by: sequentially forming the Cr film 19 and the Cu film 20; and then depositing the Cu film 21 by electrolytic plating.

Figure 9:
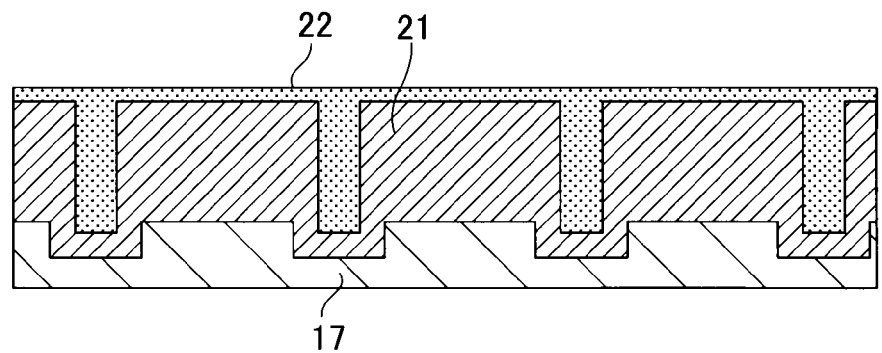
FIG. 9 is a schematic diagram sequentially showing a step (resist coating) of the method for manufacturing an electronic component according to the embodiment.
Figure 10:
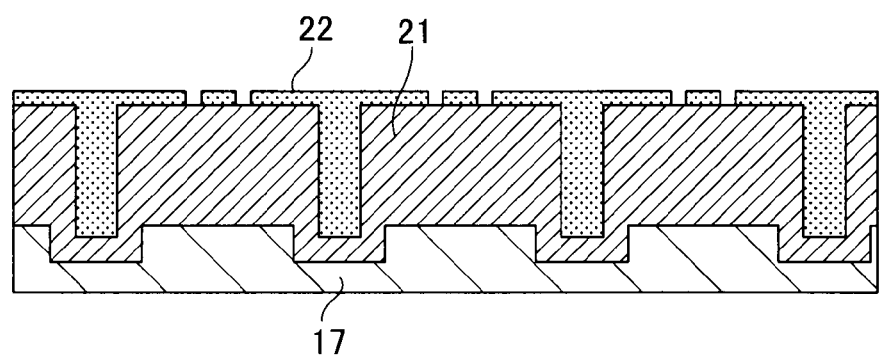
FIG. 10 is a schematic diagram sequentially showing a step (formation of an etching mask) of the method for manufacturing an electronic component according to the embodiment.
Figure 11:
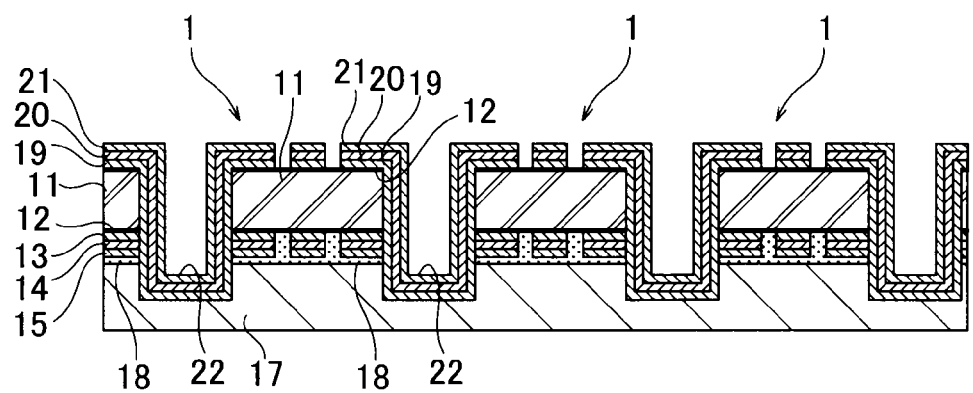
FIG. 11 is a schematic diagram sequentially showing a step (etching) of the method for manufacturing an electronic component according to the embodiment.
Figure 12:
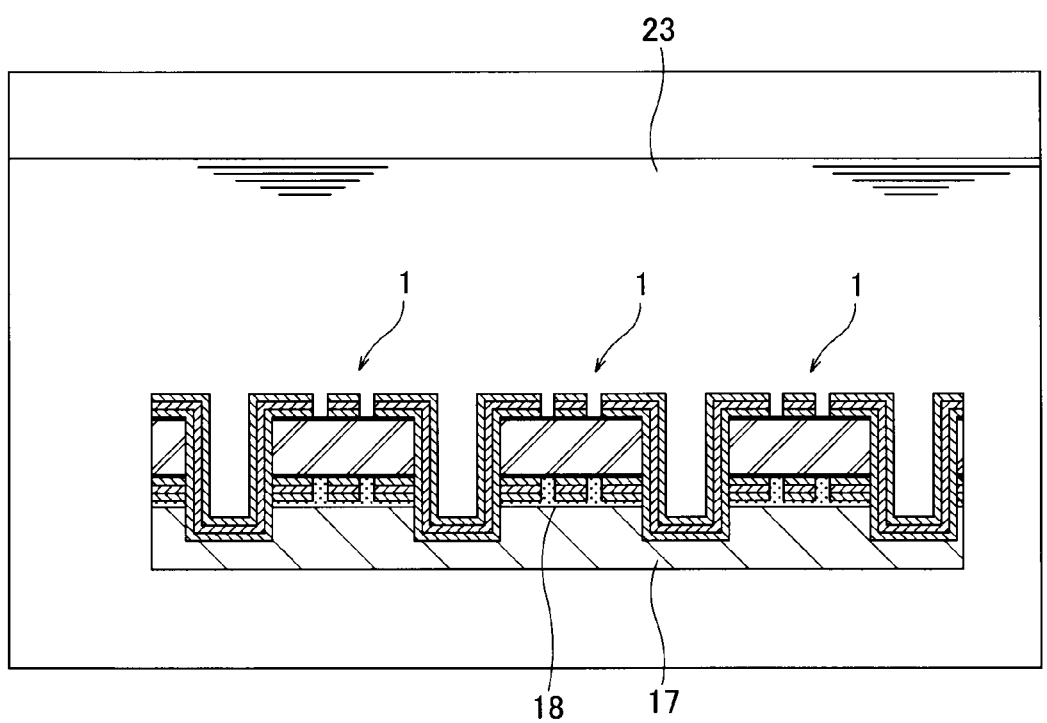
FIG. 12 is a schematic diagram sequentially showing a step (immersion into a solvent) of the method for manufacturing an electronic component according to the embodiment.

Then, a resist 22 is coated on the Cu plated film 21 as shown in FIG. 9 and an etching mask is formed as shown in FIG. 10 by subjecting this resist 22 to an exposure-development process (a photolithographic process). The Cu films (the Cu plated film 21 and the Cu sputtered film 20) are etched by using this mask. Thereafter, the resist 22 is peeled off and the Cr film 19 is etched by using the Cu films 20 and 21 as a mask. In this way, the foundation electrode films 19 to 21 each having an L-shaped cross section are formed on the top surfaces and the peripheral surfaces of the respective chips 1 as shown in FIG. 11. The L-shaped electrodes 19 to 21 are formed so as to be bonded to the foundation electrodes 13 to 15 formed on the chip bottom surfaces. In this way, it is possible to form the U-shaped electrodes extending from the top surfaces 2 to the peripheral surfaces 4 and to the bottom surfaces 3 of the chips 1 on the four peripheral surfaces 4*a*, 4*a*, 4*b*, and 4*b* of the chips 1 as shown in FIG. 15.

After forming the foundation electrodes 19 to 21 on the respective chips 1, the adhesive sheet 18 is dissolved by immersing the substrate 11 (the chips 1) into a solvent liquid 23 together with the support 17, and the respective chips 1 are detached from the support plate 17 while applying ultrasonic oscillation at the same time. Here, at the time of forming the electrodes on the bottom surfaces and the peripheral surfaces of the chips (FIG. 11), the films are also formed on the bottom surfaces of the cut grooves 25 (the top surface of the support plate 17) continuously with the electrodes 19 to 21 on the chip peripheral surfaces. However, the films on the bottom surfaces of the cut grooves are defined substantially perpendicular to the direction of sputtering irradiation. Accordingly, while the films are attached relatively firmly, the films formed on the wall surfaces of the cut grooves defined between the bottom surfaces of the cut grooves and the chips 1 have smaller film thickness distribution or weaker adhesion in comparison with the films on the bottom surfaces. Hence the films can be easily cut out by the immersion into the solvent and the ultrasonic process.

Therefore, while the film sections 22 at the bottom surface of the cut grooves remain supported by the support plate 17 as shown in FIG. 13, the respective chips 1 are detached from the support plate 17 and float into the solvent liquid. Concerning each of the chips 1 detached from the support plate 17, it is possible to further form desired electrode films on the U-shaped foundation electrodes 13 to 15 and 19 to 21 in another process (such as barrel plating). Here, it is to be noted that FIG. 1 to FIG. 13 are merely schematic. Although it depends on the type of the chips and the size of the substrate, the substrate is divided into a large number of (such as several hundred to several thousand of) chips in reality. Therefore, it is possible to obtain a large number of the chips 1 at the same time.

Figure 16:
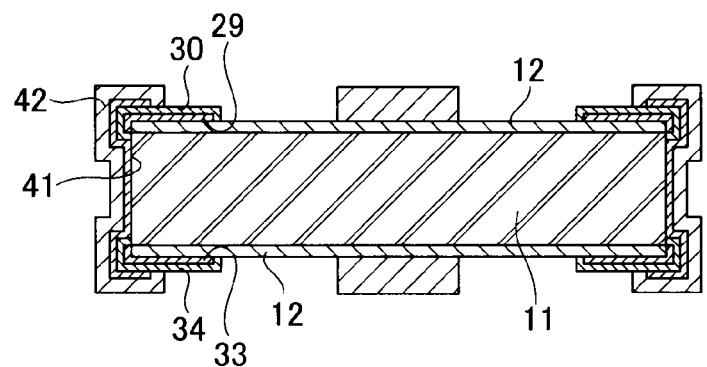
FIG. 16 is a view showing an example of a cross-sectional structure of terminal electrodes formed in accordance with a conventional method.

FIG. 16 schematically shows a cross-sectional structure of a chip provided with terminal electrodes (foundation electrodes) in accordance with a conventional manufacturing method. As shown in this drawing, foundation Cr films 29 and 33 and foundation Cu films 30 and 34 are sequentially laminated on a top surface and a bottom surface of the chip, respectively, and foundation Cr films 41 and foundation Cu films 42 are formed on peripheral surfaces of the chip so as to connect the foundation electrode films 29, 30, 33, and 34. However, the Cr films 29, 41, and 33 as well as the Cu films 30, 42, and 34 are mutually segmented and there are interfaces therebetween.

Figure 17:
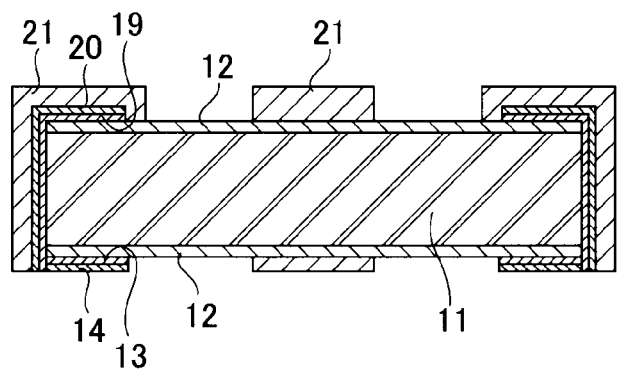
FIG. 17 is a view showing an example of a cross-sectional structure of terminal electrodes formed in accordance with method of the embodiment.

On the other hand, FIG. 17 schematically shows a cross-sectional structure of electrode sections of the chip provided with the terminal electrodes (the foundation electrodes) in accordance with the manufacturing method according to this embodiment. As shown in the drawing, the foundation Cr film 13 and the foundation Cu film 14 deposited by sputtering are laminated on the bottom surface of the chip. Moreover, the foundation Cr film 19 and the foundation Cu film 20 deposited similarly by sputtering, and the Cu plated film 21 are further laminated thereof, on the top surface and the peripheral surfaces of the chip. These films 19 to 21 constitute a continuous film without an interface from the peripheral surfaces to the top surface of the chip.

Figure 18:
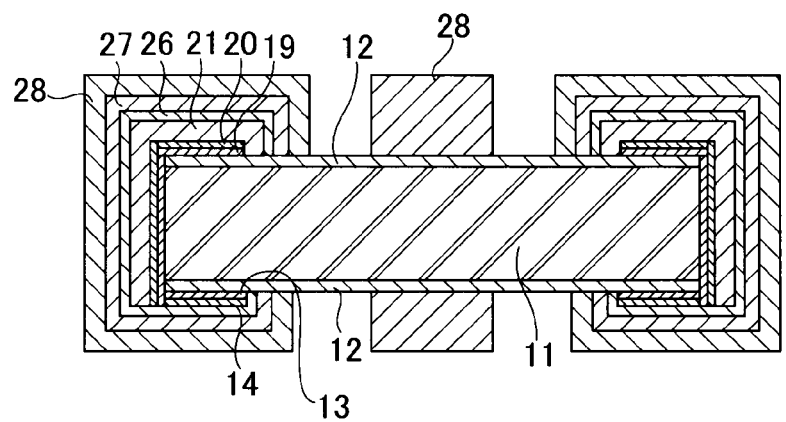
FIG. 18 is a view showing an example of further subjecting the terminal electrode (FIG. 17) formed in accordance with the method of the embodiment to a plating process.

Moreover, FIG. 18 shows another example of more electrode films on the foundation electrode films 19 to 21 shown in FIG. 17. As shown in the drawing, a Cu plated film 26, a Ni film 27 serving as a barrier layer, and a Sn film 28 for enhancing solder wettability may be respectively formed on the Cu plated film 21 by barrel plating, for example. It should be noted that the foundation electrode films 13, 14, and 19 to 21 are included here, and that the materials and the number of lamination of these electrode films may be arbitrarily selected depending on the type of the chips, the aspect of mounting, the material of opponent connection pads used for mounting, the bonding material (solder or bumps, the material of the bumps), and other parameters. Various other aspects are also applicable.

Figure 19A:
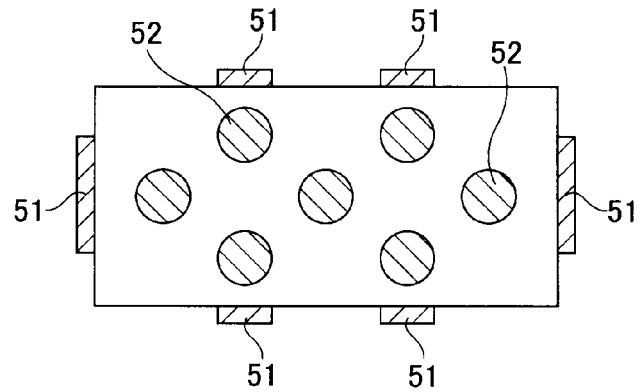
FIG. 19A is a plan view showing an example of a chip provided with an electrode in accordance with the method of the present invention.
Figure 19B:
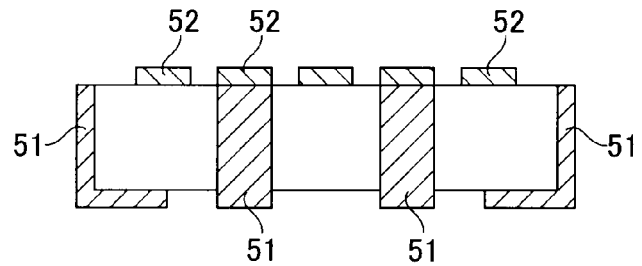
FIG. 19B is a side view showing the example of the chip provided with the electrode in accordance with the method of the present invention.
Figure 20A:
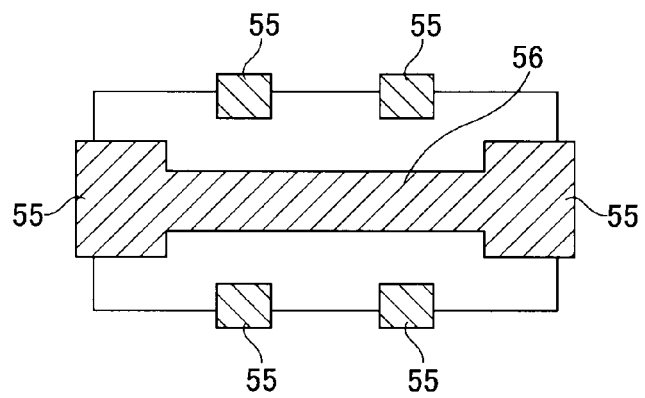
FIG. 20A is a plan view showing another example of a chip provided with an electrode in accordance with the method of the present invention.
Figure 20B:
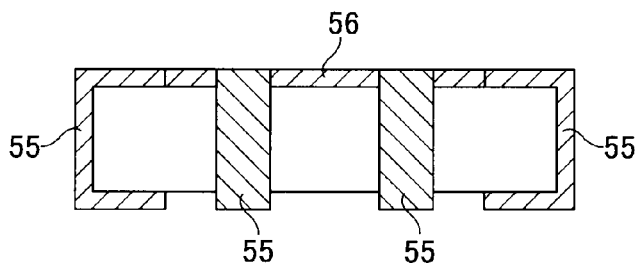
FIG. 20B is a side view showing the other example of the chip provided with the electrode in accordance with the method of the present invention.

Moreover, the number, the shape, the dimensions, the layout and other parameters of the terminal electrodes may be designed arbitrarily by forming the resist masks into desired shapes in the electrode film forming steps (from FIG. 2 to FIG. 5 and from FIG. 8 to FIG. 11). For example, FIG. 19A and FIG. 19B show an example of: providing two pieces of L-shaped electrodes 51 extending from side surfaces to a bottom surface on the respective side surfaces; and forming multiple connection pads 52 on a top surface. Meanwhile, FIG. 20A and FIG. 20B show an example of: providing two U-shaped electrodes extending from either a side surface or an end surface to a bottom surface on each side surface; providing one electrode 55 of the same type on each end surface; and forming a line 56 for mutually connecting electrode sections 56 located on a top surface out of the U-shaped electrodes disposed on the respective end surface sides. Various other conductors can be formed on the surfaces of the chip in addition to these configurations.

Advantages of the present invention and the embodiment are summarized as follows.

(1) Multiple electrodes (terminals) can be formed collectively.

(2) Manufacturing steps can be simplified because it is not necessary to arrange the chips when forming the terminals.

(3) Adjustment of a system, or arrangement and replacement of jigs concerning chip arrangement depending on the product type or the shape of the electrodes (terminals) is unnecessary.

(4) The present invention can flexibly deal with various pattern shapes and product shapes. Therefore, it is easier to correspond to diversified products.

(5) The present invention is rational and efficient because of a capability of processing aggregates directly.

(6) The present invention can achieve formation of fine patterns because photolithography is used for forming the electrodes.

(7) The present invention can deal with multiple terminals while achieving small sizes and low profiles.

(8) The present invention can enhance connection reliability because of a capability of forming the electrodes on the top surface, the bottom surface, and the peripheral surfaces (the side surface and the end surface).

(9) The present invention allows formation of multiple terminals respectively on six surfaces of the top surface, the bottom surface, and the peripheral surfaces (the side surfaces and the end surfaces) and allows connection of a product in a direction of any outer surface thereof. Accordingly, it is possible to achieve three-dimensional circuit connection. For example, it is also possible to form bottom surface terminals for the LGA (land grid array) on the top surface and the bottom surface of the chip product together with the continuous terminals over the top surface, the peripheral surface, and the bottom surface. In this way, the present invention can achieve various aspects of connection to a mounting substrate.

(10) The present invention also allows utilization of the peripheral surfaces of the chip as a wiring layer (such as provision of lines for impedance adjustment).

The present invention is not limited only to the embodiment described with reference to the accompanying drawings. It is obvious for those skilled in the art that various other modifications are possible without departing from the scope of the invention as defined in the appended claims.

For example, the embodiment uses the sputtering method for formation of the foundation electrodes on the top surface, the bottom surface, and the peripheral surfaces of the chip. However, it is also possible to use other vapor deposition methods (such as a vapor deposition method or a CVD method) instead. Alternatively, it is also possible to use an electroless plating method. Meanwhile, the embodiment uses a subtractive method for forming the electrodes, which is configured to cover the portion intended for forming the electrode by use of the resist and to remove the film not covered with the resist by means of etching. Instead, it is also possible to form the electrode in accordance with an additive method (which is configured to cover the portion other than the region intended for forming the electrode by use of a resist, and to deposit or precipitate an electrode material on a chip surface portion not covered with the resist). Moreover, in the embodiment, the support plate is immersed into the solvent liquid in order to detach the chips therefrom. Instead, it is also possible to detach the chips from the support plate by means of soft etching, for example.

What is claimed is:

1. A method for manufacturing an electronic component comprising:
   a temporary bonding step of temporarily bonding a substrate to a support plate by pressing a first surface of the substrate onto the support plate with an adhesive sheet interposed therebetween, the adhesive sheet containing, as a main component, a resin soluble to a solvent;
   a substrate dividing step of forming a cut groove for dividing the substrate into an individual electronic component by providing the substrate with a cut extending in the thickness direction from a second surface side, located opposite the first surface side, to a certain part of the support plate;
   a continuous electrode forming step of forming a continuous electrode on the second surface and on a peripheral surface located inside the cut groove, of the electronic component; and
   a component detaching step of detaching the electronic component from the support plate, the component detaching step including a process of immersing the electronic component temporarily bonded to the support plate into the solvent.

2. The method for manufacturing an electronic component according to claim 1, further comprising:
   a first surface electrode forming step of forming an electrode on the first surface of the substrate prior to the temporary bonding step,
   wherein the continuous electrode to be formed on the peripheral surface of the electronic component is formed in the continuous electrode forming step so as to be connected to the electrode formed in the first surface electrode forming step.

3. The method for manufacturing an electronic component according to claim 2,
   wherein the resin is an acrylic resin, and
   the solvent is a liquid containing an alcohol as a main component.

4. The method for manufacturing an electronic component according to claim 3,
   wherein the component detaching step further includes a process to apply ultrasonic waves to the electronic component temporarily bonded to the support plate.

5. The method for manufacturing an electronic component according to claim 2,
   wherein the component detaching step further includes a process to apply ultrasonic waves to the electronic component temporarily bonded to the support plate.

6. The method for manufacturing an electronic component according to claim 1,
   wherein the resin is an acrylic resin, and
   the solvent is a liquid containing an alcohol as a main component.

7. The method for manufacturing an electronic component according to claim 6,
   wherein the component detaching step further includes a process to apply ultrasonic waves to the electronic component temporarily bonded to the support plate.

8. The method for manufacturing an electronic component according to claim 1,
   wherein the component detaching step further includes a process to apply ultrasonic waves to the electronic component temporarily bonded to the support plate.

9. The method for manufacturing an electronic component according to claim 1,
   wherein the temporary bonding step is executed in a reduced pressure.

10. The method for manufacturing an electronic component according to claim 1,
    wherein the continuous electrode forming step includes:
    a conductive film forming process to form a conductive film on the second surface and the peripheral surface located inside the cut groove, of the electronic component;
    a resist forming process to form a resist film on the conductive film;
    a resist mask forming process to selectively remove the resist film in response to the shape of the electrode to be formed;
    an etching process to selectively remove the conductive film by using the resist mask; and
    a resist peeling process to remove the resist mask.

11. The method for manufacturing an electronic component according to claim 1,
    wherein the continuous electrode forming step includes:
    a conductive film forming process to form a conductive film on the second surface and the peripheral surface located inside the cut groove, of the electronic component;
    a resist forming process to form a resist film on the conductive film;
    a resist mask forming process to selectively remove the resist film in response to the shape of the electrode to be formed;
    a plating process to deposit a plated metal film on the conductive film by using the resist mask;
    a resist peeling process to remove the resist mask; and an etching process to remove the conductive film located below the resist mask.

12. The method for manufacturing an electronic component according to claim 1, wherein the continuous electrode forming step includes:

a thin-film forming process to form a thin film on the second surface and the peripheral surface of the electronic component by a vapor deposition method after formation of the cut groove by the substrate dividing step.

13. The method for manufacturing an electronic component according to claim 12, wherein the vapor deposition method is a sputtering method.

14. The method for manufacturing an electronic component according to claim 12, wherein the thin film is a film containing any of chromium, titanium, nickel, nickel-chromium, tungsten, copper, and silver as a main component.

15. The method for manufacturing an electronic component according to claim 14, wherein the continuous electrode forming step includes a process to further form an electrolytically plated copper film on the thin film.

* * * * *